United States Patent [19]
Morgan et al.

[11] Patent Number: 5,764,502
[45] Date of Patent: Jun. 9, 1998

[54] INTEGRATED ELECTRIC POWER SYSTEM

[75] Inventors: Earl Morgan; Robert Ligon; Mark Seger, all of Rockford, Ill.

[73] Assignee: Sundstrand Corporation, Rockford, Ill.

[21] Appl. No.: 654,436

[22] Filed: May 28, 1996

[51] Int. Cl.$^6$ .................................................. H02M 7/00
[52] U.S. Cl. ............................. 363/65; 307/82; 307/73; 307/66
[58] Field of Search .............................. 363/65; 307/66, 307/64, 82, 73, 76

[56] References Cited

U.S. PATENT DOCUMENTS

| | | |
|---|---|---|
| 959,762 | 5/1910 | Lake et al. |
| 3,005,934 | 10/1961 | Vogelsberg ............... 317/119 |
| 3,267,333 | 8/1966 | Schultz ..................... 317/100 |
| 3,325,693 | 6/1967 | Stanback .................. 317/119 |
| 4,321,645 | 3/1982 | Thom et al. ................ 361/63 |
| 4,386,278 | 5/1983 | Kawada et al. ............. 307/9 |
| 4,403,292 | 9/1983 | Ejzak et al. ............... 364/492 |
| 4,551,632 | 11/1985 | Jourdan et al. ............ 307/9 |
| 4,661,762 | 4/1987 | Baker ....................... 307/87 |
| 5,065,283 | 11/1991 | Adachi et al. ............. 361/407 |
| 5,134,543 | 7/1992 | Sharp et al. ............... 361/358 |
| 5,199,912 | 4/1993 | Dade et al. ................. 440/6 |
| 5,227,955 | 7/1993 | Le Bris et al. ............. 361/395 |
| 5,274,528 | 12/1993 | Noschese et al. .......... 361/642 |
| 5,375,036 | 12/1994 | Magdaleno ................ 361/673 |
| 5,384,490 | 1/1995 | Swartz, Jr. ................ 307/38 |
| 5,465,011 | 11/1995 | Miller et al. ............... 307/64 |
| 5,466,974 | 11/1995 | Sutrina et al. ............. 307/38 |

FOREIGN PATENT DOCUMENTS

3344813 A1  6/1984  Germany.

*Primary Examiner*—Peter S. Wong
*Assistant Examiner*—Shawn Riley
*Attorney, Agent, or Firm*—Jeffery J. Makeever

[57] ABSTRACT

An electric power generation system having two main sources of ac power comprises a first and a second main power conversion and distribution unit (MPCDU1, MPCDU2), each electrically coupled to one of the sources of ac power. The MPCDUs controllably supply ac electric power to an associated main distribution bus and additionally convert that power to a second type of power. This second type of power is supplied to an associated secondary distribution bus and to a converted power output. The system also includes an auxiliary source of ac power and an auxiliary power conversion and distribution unit (APCDU) which is electrically coupled to the auxiliary source. The APCDU controllably supplies ac electric power to a ground service distribution bus and additionally converts that power to a second type of power which is then supplied to an associated secondary distribution bus and to a converted power output. Additionally, the MPCDUs and the APCDU each controllably supply ac electric power to, and demand power from, an ac tie bus. The system additionally comprises a central power conversion and distribution unit (CPCDU) which is electrically coupled to the converted power output of each MPCDU, and to the converted power output of the APCDU. The CPCDU selectively converts the second type of power from each MPCDU and the APCDU to an emergency type of power. This emergency power is controllably supplied to an emergency distribution bus.

40 Claims, 10 Drawing Sheets

INTEGRATED ELECTRIC POWER SYSTEM

FIELD OF THE INVENTION

The instant invention relates generally to electric power generation and distribution systems, and more particularly to an electric power generation and distribution system for aircraft having an integrated modular design incorporating ac and dc power generation and conversion, as well as auxiliary, ground service, and emergency power functions, including battery backup power.

BACKGROUND ART

The complexity and power requirements of modern commercial aircraft continue to increase as the need for greater range and passenger and cargo carrying capacity increases. In an effort to attain these goals and improve passenger comfort and convenience, newer aircraft are being equipped with more electric and electrical equipment in place of older technology equipment. Inclusion of electric pumps, actuators, and advanced motor drives allow greater efficiencies to be realized in many sub-systems of the aircraft. State of the art electronic personal entertainment systems and work stations allow traveler comfort and productivity to be increased, especially on long trips. Pilot workload is being reduced by cockpit controls which are being automated by more electronics, by removal of the old analog gauges, and by replacement with state of the art computer monitor CRTs. Automated flight controls and fly-by-wire technologies which are fully transforming the control center of the aircraft into a "glass cockpit" are also reducing the pilot workload while increasing safety.

All of these advances are capable only through the supply of electricity; a lot of electricity. The modern commercial aircraft is now required by all this advanced technology to supply itself with the equivalent electric power consumed by approximately thirty households (360 kVA), and with enough overload capacity to supply over sixty households (600 kVA). Even in smaller aircraft, the amount of electricity required by the advances in other aircraft subsystems requires a proportionally large amount of electric power generation. Unfortunately, current design methods and conventional thought concerning the acceptable architecture for an electric power distribution system leads to increased weight and lower reliability for the aircraft. Since each additional pound on the aircraft leads to increased fuel burn, decreased range, and increased cost of ownership, there is a great need for innovative thinking in the design of an aircraft electric power generation and distribution system.

It is a principle object of the instant invention, therefore, to provide a new and improved electric power generation and distribution system which reduces system weight. It is a further objective of the instant invention to provide a distribution system which has substantially fewer components than a conventional distributed component electric power distribution system. Additionally, it is an object of the instant invention to provide an electric power distribution system which simplifies the number and connection of distribution busses while maintaining functional redundancy requirements for dispatch reliability. Further, it is an object of the instant invention to provide electric power to generator ac distribution busses, ground service distribution busses, dc distribution busses, a dc emergency bus, and an ac emergency bus with a minimum of components and switching circuits.

SUMMARY OF THE INVENTION

In a preferred embodiment of the instant invention, an electric power generation and distribution system having at least one source of ac electric power comprises a first main power conversion and distribution unit (MPCDU1) which is electrically coupled to the source of ac electric power. This MPCDU1 controllably supplies ac electric power from the source of ac electric power to a first main distribution bus. In addition, the MPCDU1 converts the ac electric power from the source to a second type of power which is then supplied to a secondary distribution bus and also to a converted power output. The system also comprises a secondary power conversion and distribution unit (SPCDU) which is electrically coupled to the converted power output of the MPCDU1. This SPCDU converts the second type of power from the MPCDU1 to an emergency type of power which is then supplied to an emergency power bus.

The power conversion from ac electric power to a second type of power is dependent on system requirements, and may take several forms. If the ac power from the source is constant frequency ac power, the secondary type of power is typically dc. If, however, the ac power from the source is variable frequency ac power, the system may require conversion to constant frequency ac power as the secondary type of power, or may also require dc power. In a typical system with the secondary type of power being dc, the emergency type of power converted from this dc power in the SPCDU is most typically constant frequency ac electric power.

The MPCDU1, in addition to its power distribution and conversion functions, senses the magnitude of the ac electric power generated by the source and controls the excitation of the source to maintain the magnitude within predetermined limits. The MPCDU1 also senses and regulates the frequency of the source in a preferred embodiment. Protection of the feeders from the source to the MPCDU1 is also provided by the MPCDU1, as well as system protections such as over and under voltage, over and under frequency, overcurrent, etc. The MPCDU1 accomplishes these functions preferably through the use of a microprocessor. The distribution function, which is provided by internal bus work and main line contactors, is also coordinated by the microprocessor. Communications of operating parameters and external control and status signals via a data bus is also provided.

Each channel of the generation system includes a power conversion and distribution unit. For a two channel system with a source of auxiliary power, the system includes a MPCDU2 and an auxiliary power conversion and distribution unit (APCDU). In addition to the functions listed above, the APCDU also controls the distribution of external power to the system. For multichannel systems, an ac tie bus is included which allows power from one channel to be supplied to/from another channel. The coordination of each channel's connection to this ac tie bus is accomplished by each MPCDU and the APCDU. A battery is also included, and the coordination and distribution of its output power is accomplished by the SPCDU. The SPCDU also converts power from an ac ground service bus to controllably charge the battery as required.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
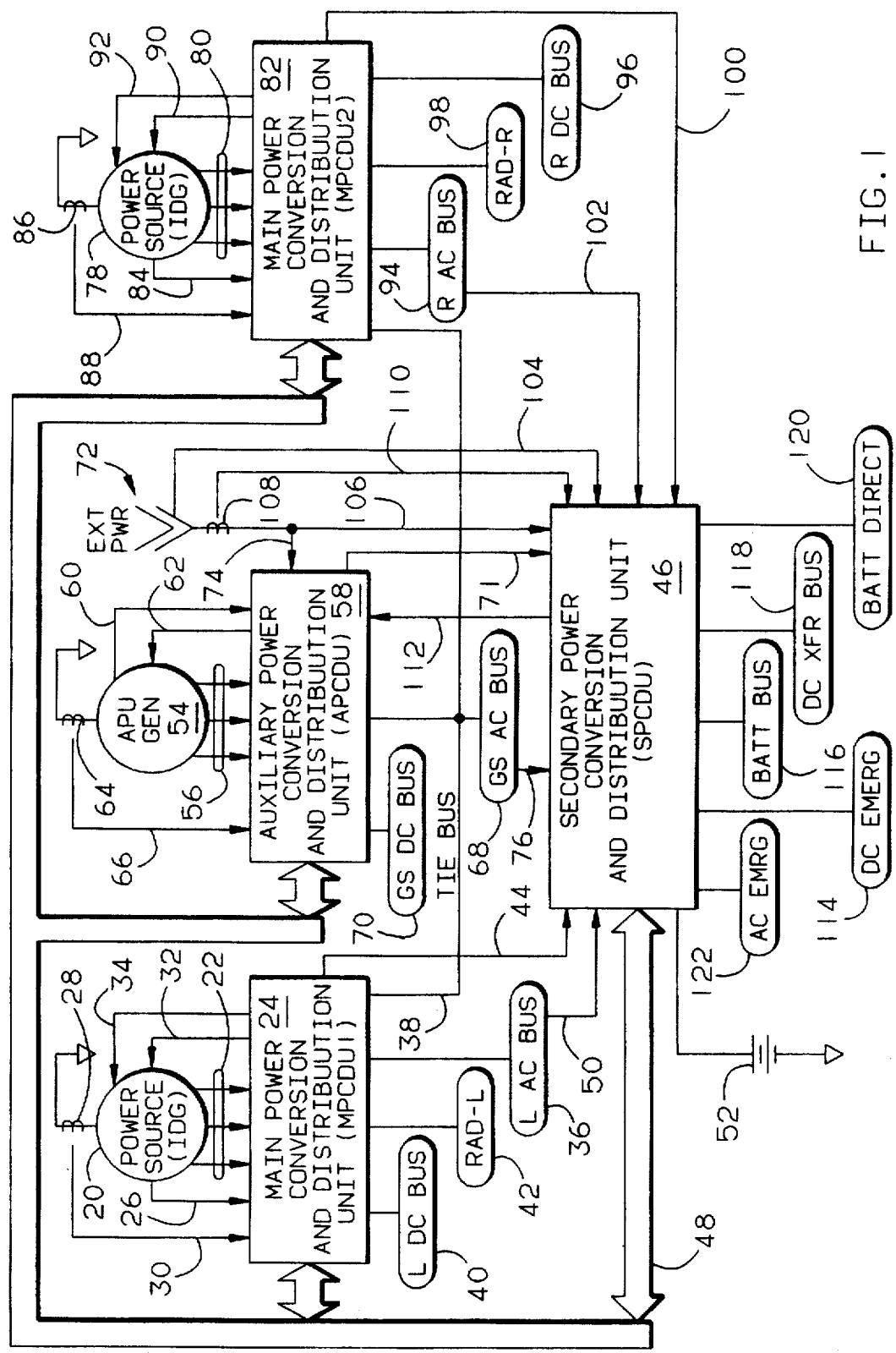
FIG. 1 is a system level block diagram illustrating an electric power generation and distribution system in accordance with an embodiment of the instant invention.

In a preferred embodiment of the instant invention as illustrated in FIG. 1, a source of ac electric power, such as an integrated drive generator (IDG) 20 manufactured by the assignee of the instant invention, is coupled by power feeders 22 to a main power conversion and distribution unit (MPCDU1) 24. While FIG. 1 illustrates the use of an IDG 20, it will be understood that any source of ac electric power may be used in its stead, including a variable speed, variable frequency generator. In addition to the power feeders 22, the IDG 20 also supplies the MPCDU1 24 with power from an internal permanent magnet generator (not shown) via line 26. The MPCDU1 24 also receives an input from the generator current transformer 28 via line 30. The MPCDU1 24 provides voltage control to the IDG 20 via line 32, and speed/frequency control via line 34. The MPCDU1 24 supplies ac power to a main ac distribution bus 36, and to an ac tie bus 38. The MPCDU1 24 also supplies dc power to a main dc distribution bus 40, to a radar bus 42, and via line 44 to a secondary power conversion and distribution unit (SPCDU) 46. Each of these dc supply lines 40, 42, and 44 are protected by a resettable circuit breaker 41, 43, and 45 respectively. The MPCDU1 24 also communicates with a communication bus 48.

In a highly preferred embodiment of the instant invention, an auxiliary power unit generator (APU GEN) 54 is also provided to supply ac electric power. This auxiliary ac power is supplied by auxiliary power feeders 56 to an auxiliary power conversion and distribution unit (APCDU) 58. In addition to the auxiliary ac power, the APU GEN 54 also supplies the APCDU 58 with power from an internal PMG (not shown) via line 60. Output voltage control is accomplished by the APCDU 58 via control line 62. APU GEN 54 current information is supplied by an APU GEN current transformer (CT) 64 via line 66 to the APCDU 58. The APCDU 58 supplies ac power to an ac ground service bus 68 through the ac tie bus 38, and supplies dc power to a dc ground service bus 70 and to the SPCDU 46 via line 71. Additionally, the APCDU 58 communicates with the communication bus 48. Preferably, a source of external power (not shown) may be coupled by an external power receptacle 72 via external power feeders 74 to the APCDU 58 for distribution and conversion.

Further, in a preferred embodiment of the instant invention, at least a second main channel of ac power generation is included. In this second channel, the source of ac electric power may also be an IDG 78, and is coupled by power feeders 80 to a main power conversion and distribution unit (MPCDU2) 82. In addition to the power feeders 80, the IDG 78 also supplies the MPCDU2 82 with power from an internal permanent magnet generator (not shown) via line 84. The MPCDU2 82 also receives an input from the generator current transformer 86 via line 88. The MPCDU2 82 provides voltage control to the IDG 78 via line 90, and speed/frequency control via line 92. The MPCDU2 82 supplies ac power to a main ac distribution bus 94, and to the ac tie bus 38. The MPCDU2 82 also supplies dc power to a main dc distribution bus 96, to a radar bus 98, and via line 100 to the SPCDU 46. The MPCDU2 82 also communicates with the communication bus 48.

The SPCDU 46, in addition to receiving dc power from the MPCDU1 24 via line 44, from the APCDU 58 via line 71, and from the MPCDU2 via line 100, also receives ac power from the main ac distribution bus 36 via line 50, from the ac ground service bus 68 via line 76, and from the main ac distribution bus 94 via line 102. The SPCDU 46 also receives ac power from the source of external power (not shown) via line 106. Protection of the external power is provided by external power current transformer (CT) 108 via line 110. Correct connection of the external power to receptacle 72 is provided by two locating pins via line 104. The control of external power distribution is provided from the SPCDU 46 to the APCDU 58 via line 112. The SPCDU also is electrically coupled to a battery 52. The dc power from these various sources is distributed to a dc emergency bus 114, a battery bus 116, a dc transfer bus 118, and a battery direct bus 120. Ac power is converted and supplied to an ac emergency bus 122. Communication with the SPCDU 46 is provided by the communication bus 48.

Figure 2:
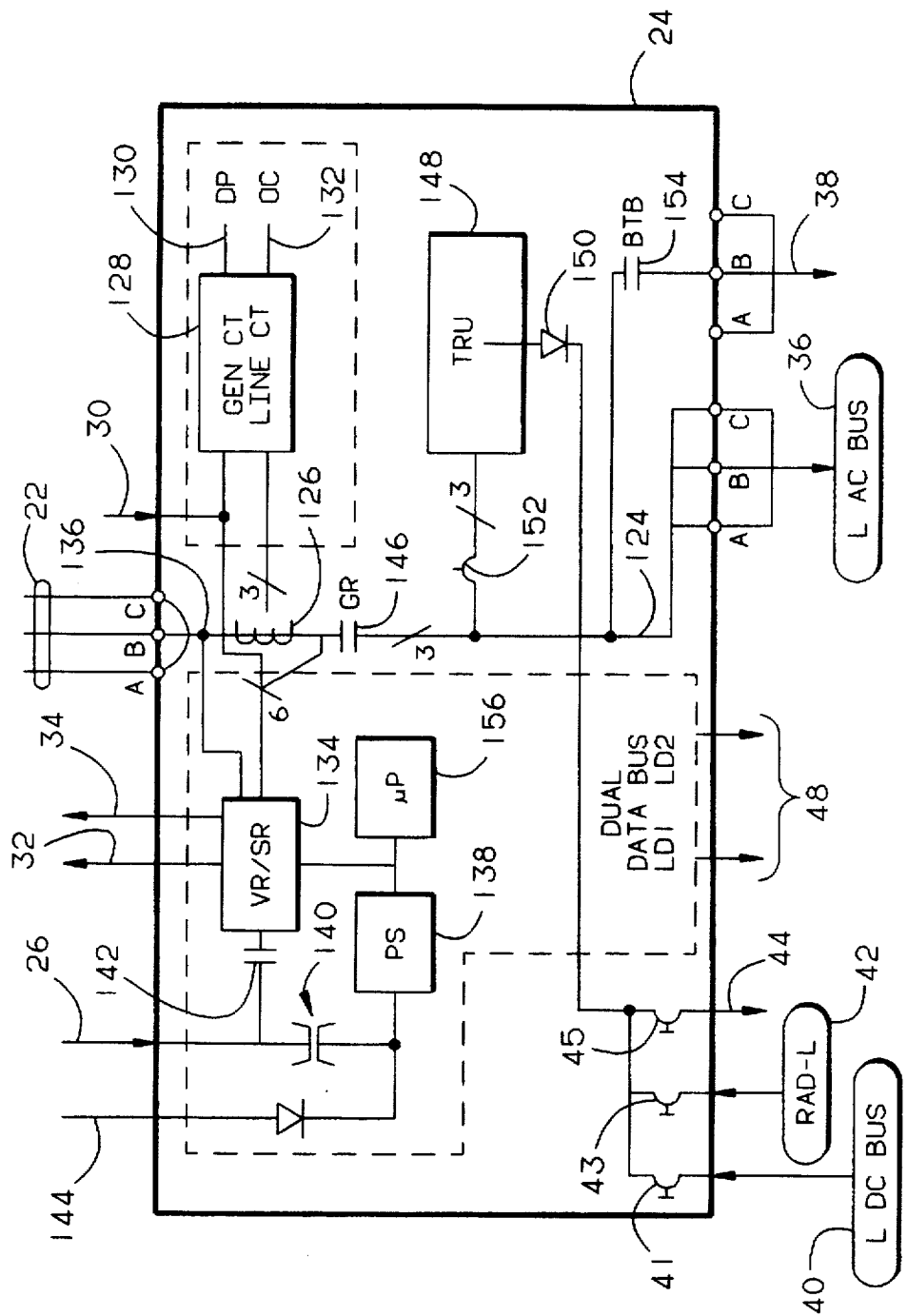
FIG. 2 is a single line block diagram illustrating a main power conversion and distribution unit in accordance with the embodiment of the system of the instant invention of FIG. 1.

Construction and operation of the MPCDU1 24 may be better understood with reference to FIG. 2 (MPCDU1 and MPCDU2 are preferably identical in construction, and for simplicity and brevity of this application, only one will be described in detail). As the ac power enters the MPCDU1 24 via feeders 22, it is routed by internal bus work 124 within the MPCDU1. An internal current transformer 126 is positioned near the input of feeders 22 to sense the current flowing into the MPCDU1 24. Protection circuitry 128 monitors the inputs from this internal CT 126 and the generator CT 28 (see FIG. 1) to determine the presence of a differential current fault (indicated by line 130), or of an over current fault (indicated by line 132). The CT input 30 from the generator CT 28 is also input to the voltage regulator/ servo valve control circuitry 134 for use in controlling the IDG's output voltage and frequency. This control circuitry 134 also receives voltage level information at a point of regulation 136 located within the MPCDU1 24. The PMG input 26 is used to supply power to the MPCDU1 24 via an internal power supply 138, which is isolated from the PMG by transformer 140. For fault protection reasons, the PMG input 26 is also isolatable from the voltage regulator circuitry 134 via breaker 142. In a preferred embodiment, a source of backup power 144 would also be OR'ed into the internal power supply 138. Preferably this source would be uninterruptable, such as a battery input or a cross wired PMG input as known in the art.

Distribution of the main ac power is accomplished within the MPCDU1 24, as stated above, by internal bus work 124 which controllably routes power from the power feeders 22 to the desired outputs. A main line contactor or generator relay (GR) 146 switchably couples the input ac power to the main ac distribution bus 36. Additionally, the GR 146 switches ac power to power conversion circuitry, such as a transformer/rectifier unit (TRU) 148. This power conversion circuitry converts power from a first type to a second type. In the system illustrated, the first type of power is essentially constant frequency ac power, and the second type is dc; however, the first type may be variable frequency ac and the second type may be essentially constant frequency ac with the simple substitution of a converter for the TRU illustrated in FIG. 2. Also, with the first type being variable frequency ac, the second type may be dc as illustrated in FIG. 2. Where the second type of power, the converted power, is dc, a blocking diode 150 is included to prevent reverse flow of dc current. The input to the power conversion circuitry 148 is also protected by a resettable circuit breaker 152. Switchably controllable connection to the ac tie bus 38 is accomplished by a bus tie breaker (BTB) 154. Both control of the GR 146 and the BTB 154 is accomplished by a microprocessor 156, which also controls and coordinates other functions within the MPCDU1 24, such as protection and communication.

Figure 3:
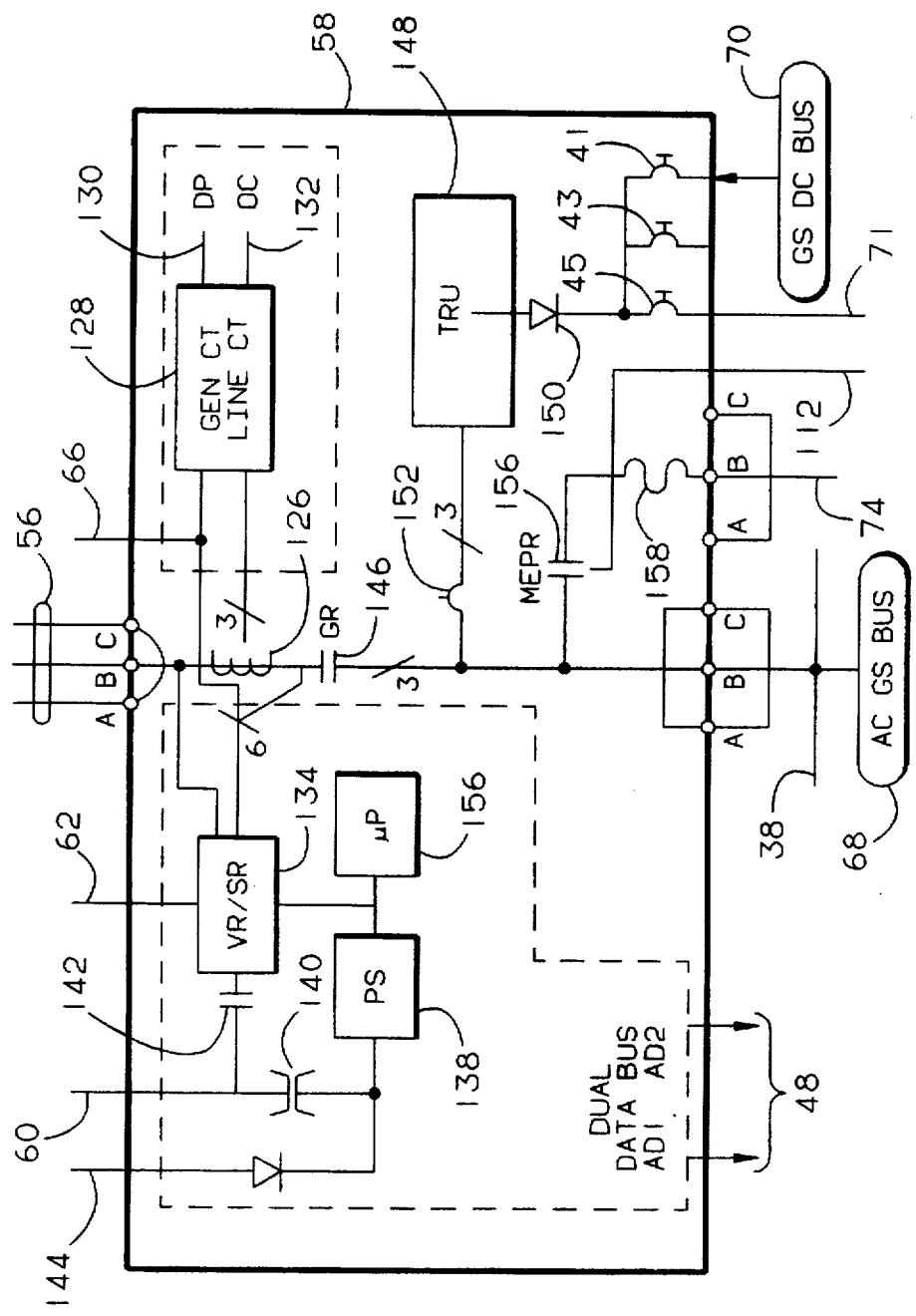
FIG. 3 is a single line block diagram illustrating an auxiliary power conversion and distribution unit in accordance with the embodiment of the system of the instant invention illustrated in FIG. 1.

FIG. 3 illustrates in greater detail the APCDU 58. This APCDU 58 is constructed similarly to the MPCDU1 24 for commonality and reduced costs, and so for brevity only those portions which differ significantly from the construction of the MPCDU1 24 will be described herein. Otherwise, like numerals are used for like components and functions and the reader is directed to the preceding paragraph for a description of the identified component or function. Unlike the MPCDU1 24, the APCDU 58 switchably coupled external power onto the ac tie bus 38 and the ac ground service bus 68. This is accomplished by the replacement of the BTB 154 of the MPCDU1 24 with a main external power relay (MEPR) 156, which is controlled by the SPCDU 46 via line 112. Preferably the MEPR 156 may be a held type relay so that the loss of control or power will result in the external power being disconnected by the MEPR 156 opening. The external power bus work internal to the APCDU 58 is also protected via fuse 158. As with the MPCDU1 24, operation of the APCDU 58 is coordinated by a microprocessor 156.

Figure 4:
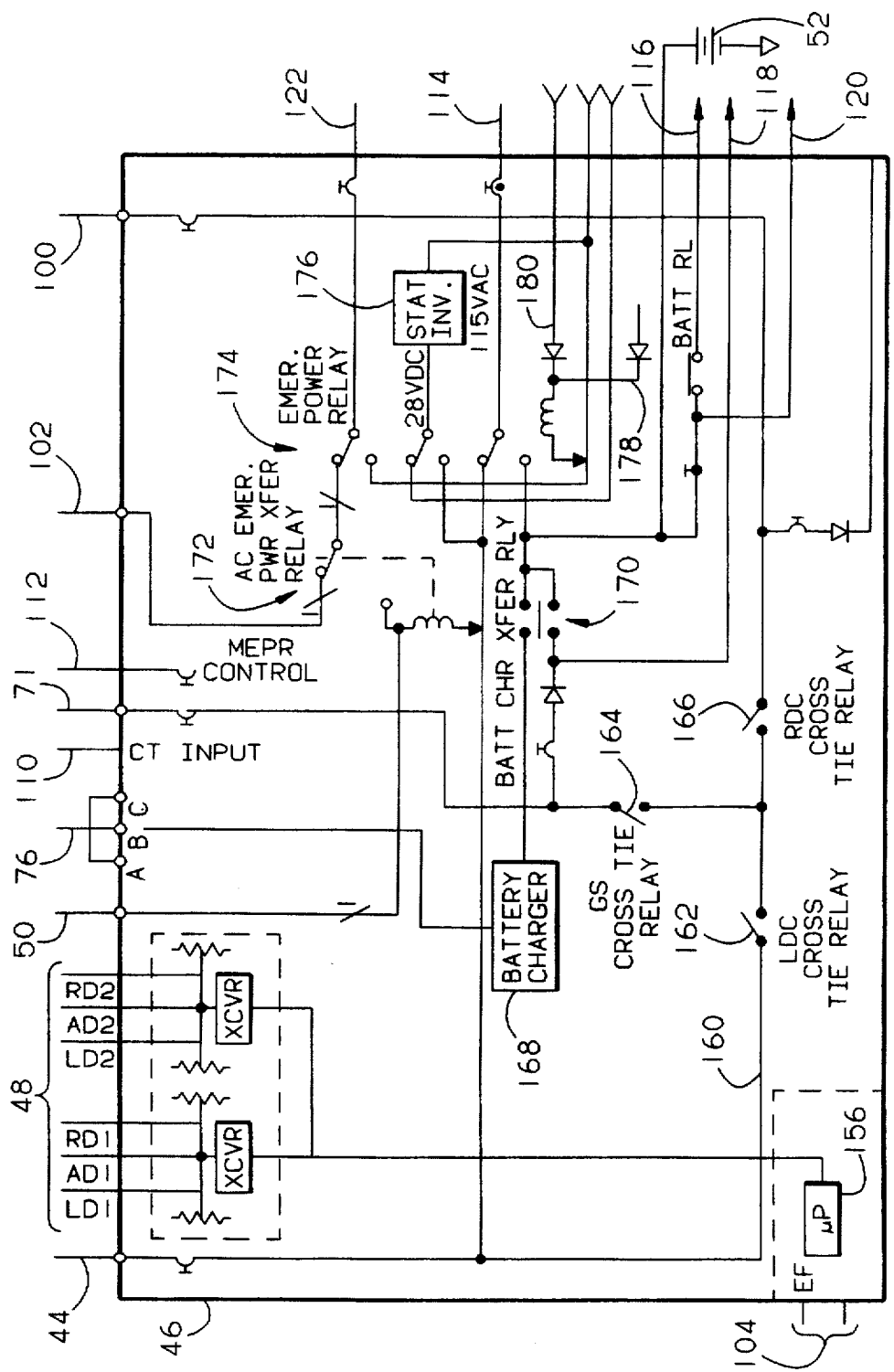
FIG. 4 is a single line block diagram illustrating a secondary power conversion and distribution unit in accordance with the embodiment of the system of the instant invention illustrated in FIG. 1.

FIG. 4 illustrates in greater detail the SPCDU 46 of FIG. 1. The distribution of the dc power supplied to the SPCDU 46 via lines 44, 71, and 100 is accomplished via internal bus work 160. Controlled switching is accomplished by three dc cross tie relays 162, 164, 166. In this way, dc power converted by either the MPCDU1 24, the APCDU 58, or the MPCDU2 82 may be used to supply any of all dc busses. The ac input from the ac ground service bus via line 76 is coupled to a controlled battery charger 168 which, through a battery charger transfer relay 170 allows the SPCDU 46 to charge the battery 52. The ac power supplied to the SPCDU 46 via lines 50 and 102 is used, through an ac emergency power transfer relay 172, to supply the ac emergency power distribution bus 122. If, however, ac power from one of these two sources is not available, the emergency power relay 174 switches in circuit a static inverter 176 which converters the dc power to ac power for use by the ac emergency power distribution bus 122. Control for this transition is controlled by the SPCDU's internal microprocessor 156 via line 178, or by a manual input via line 180.

Figure 5:
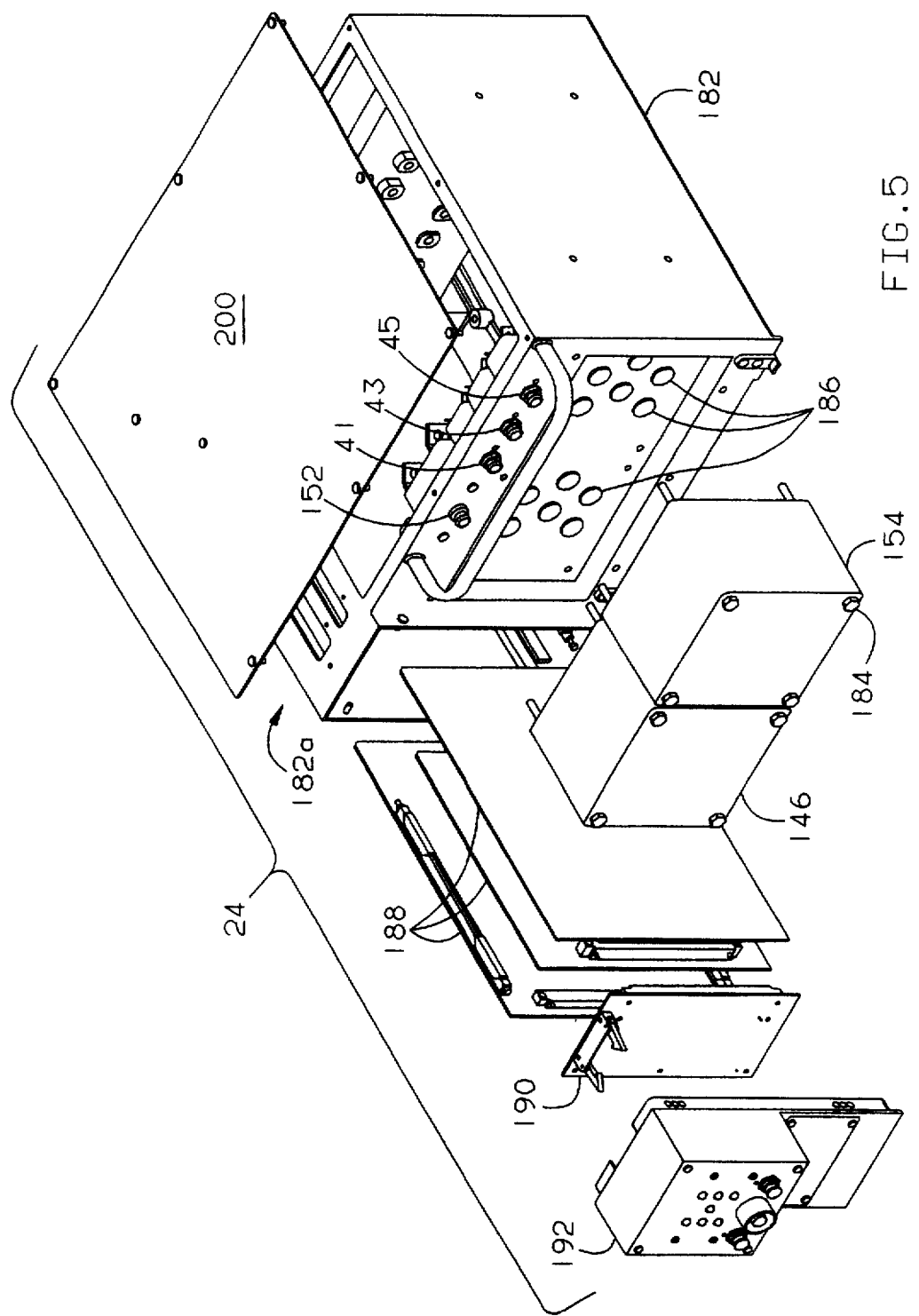
FIG. 5 is a simplified exploded frontal isometric view of a main power conversion and distribution unit constructed in accordance with an embodiment of the instant invention as illustrated in FIG. 2.
Figure 6:
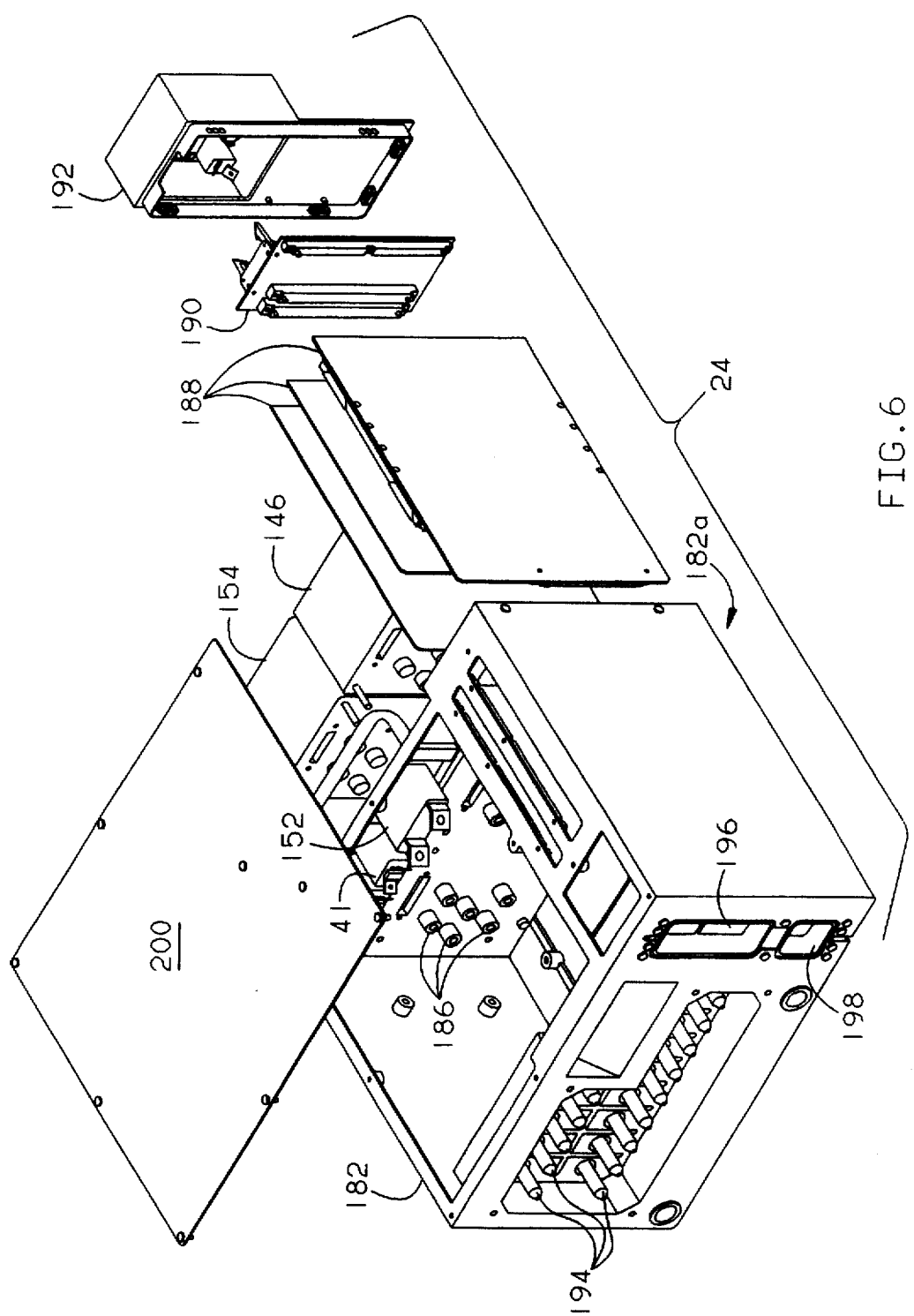
FIG. 6 is a simplified exploded rear isometric view of the main power conversion and distribution unit of FIG. 5.

FIG. 5 illustrates a simplified exploded isometric diagram of the MPCDU1 24 of FIG. 1. To aid clarity and understanding of this diagram, the internal bus work 124 and the power conversion circuitry 148 have been left out of this diagram to allow internal details to be visible. The MPCDU1 24 is constructed within a housing 182 which may preferably be rack mountable. The GR 146 and the BTB 154 are preferably mountable on the front of the housing 182 by removable screws 184 or other locking mechanism which allows easy serviceability of the contactors. The GR 146 and BTB 154 make electrical connection to the internal bus work (not shown) via electrical contacts 186 which penetrate the housing 182. The circuit breakers which protect the input to the power conversion circuitry 152, and which protect each of the dc power lines 41, 43, 45 are mounted inside the housing 182, with their manually resettable portion penetrating the housing 182 to allow crew access to reset a tripped breaker. The microprocessor 156 (see FIG. 2), control circuitry 134, protection circuitry 128, internal power supply 138, and communication circuitry are all located on circuit boards 188, positioned within a shielded portion of the housing 182a. A mother board 190 completes the internal control wiring between circuit boards 188, and also couples built in test (BIT) information between a BIT display panel 192 which is also crew accessible. The connections to the power feeders 22, and to each of the ac and dc busses supplied by the MPCDU1 24 are made via power connector pins 194 which penetrate the housing 182 at the back (see FIG. 6). The control and communication signal connections for the MPCDU1 24 are made by a connector 196, while the internal power connections are made by connector 198. Cover 200 is removably mounted on the housing 182 to allow easy access to the internal of the MPCDU1 24.

Figure 7:
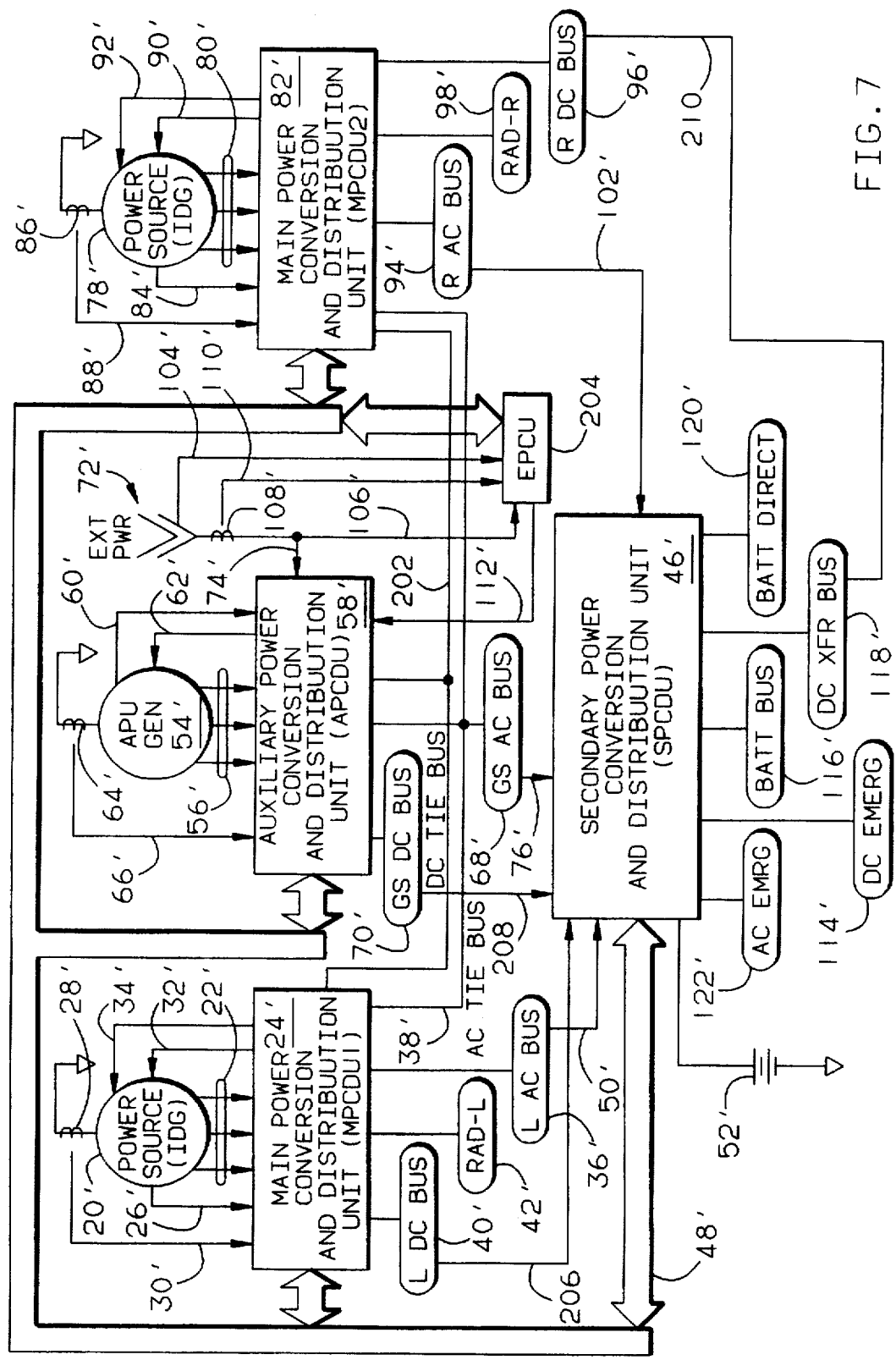
FIG. 7 is a system level block diagram illustrating an electric power generation and distribution system in accordance with an alternate embodiment of the instant invention.

FIG. 7 illustrates an alternate embodiment of the instant invention having a dc tie bus 202 and an electric power control unit (EPCU) 204 external to the SPCDU 46'. Elements illustrated in this figure and those that follow are numbered with a prime (') convention indicating elements similar to those described above with respect to FIGS. 1–6. New or different elements and wiring are so indicated by the use of unique numbers. With the main dc coupling now being accomplished external to the SPCDU 46' (removing the connection from line 44, 71, and 100 of FIG. 1), a dc supply is added from the main dc bus 40' via line 206, from the dc ground service bus 70' via line 208, and from the main dc bus 96', through the dc transfer bus 118' via line 210 to allow secondary dc distribution to the dc emergency bus 114', the battery bus 116', the dc transfer bus 118', the battery direct bus 120', and to allow conversion to supply the ac emergency bus 122'. The control functions for the external power which were provided by the SPCDU 46 of FIG. 1, are now provided by an external EPCU 204 which also communicates via the data bus 48'.

Figure 8:
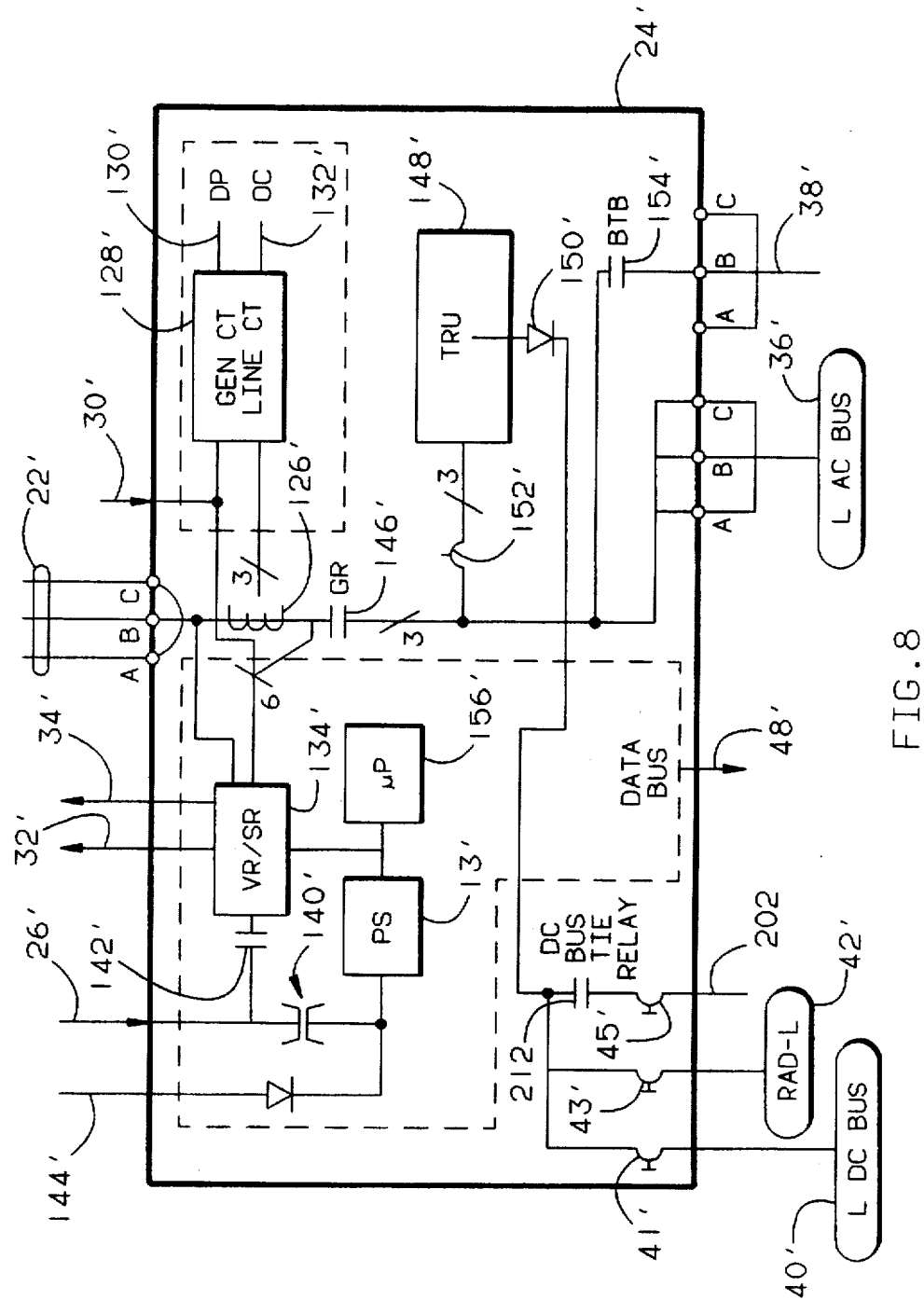
FIG. 8 is a single line block diagram illustrating a main power conversion and distribution unit in accordance with the embodiment of the system of the instant invention of FIG. 7.
Figure 9:
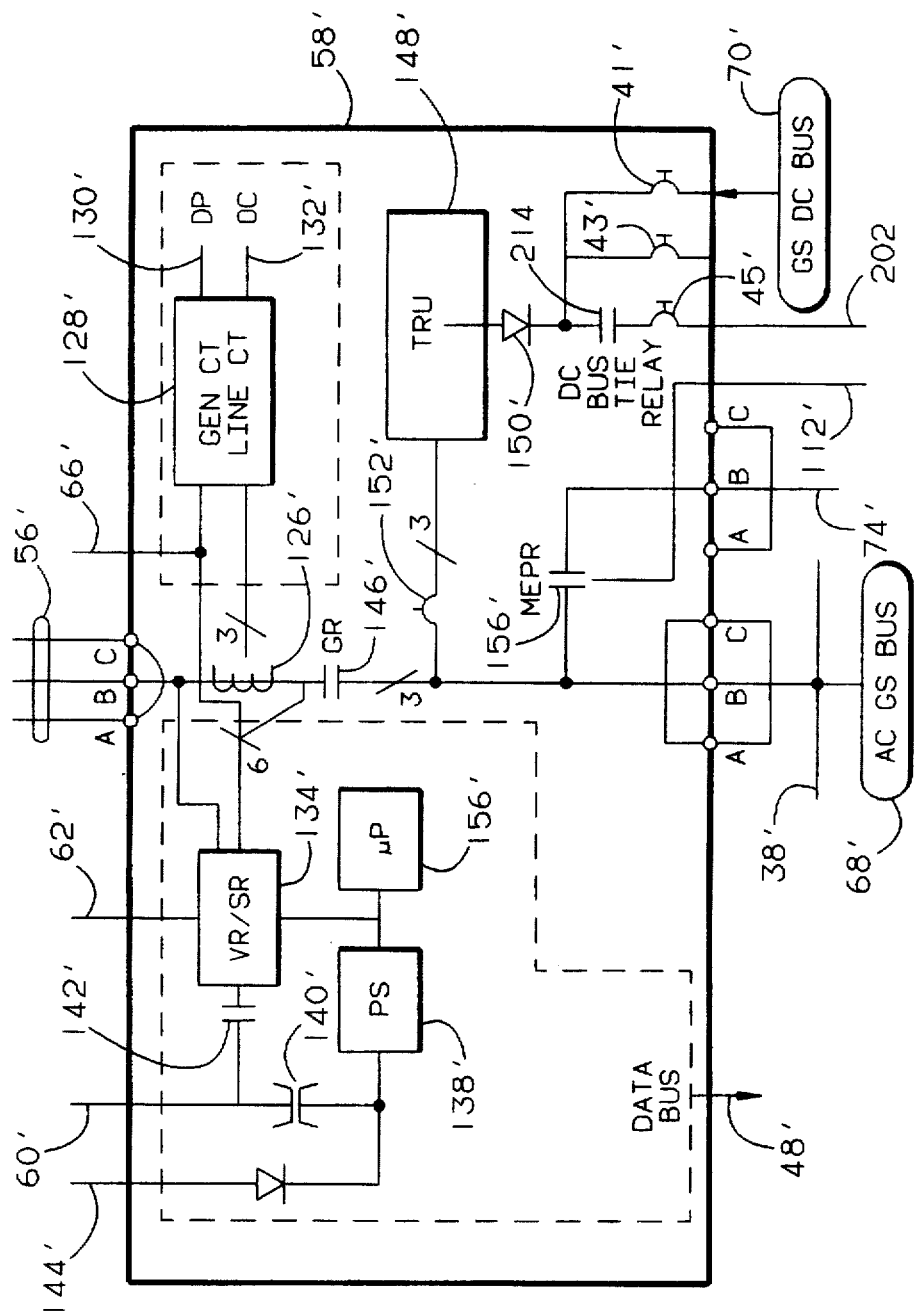
FIG. 9 is a single line block diagram illustrating an auxiliary power conversion and distribution unit in accordance with the embodiment of the system of the instant invention illustrated in FIG. 7.
Figure 10:
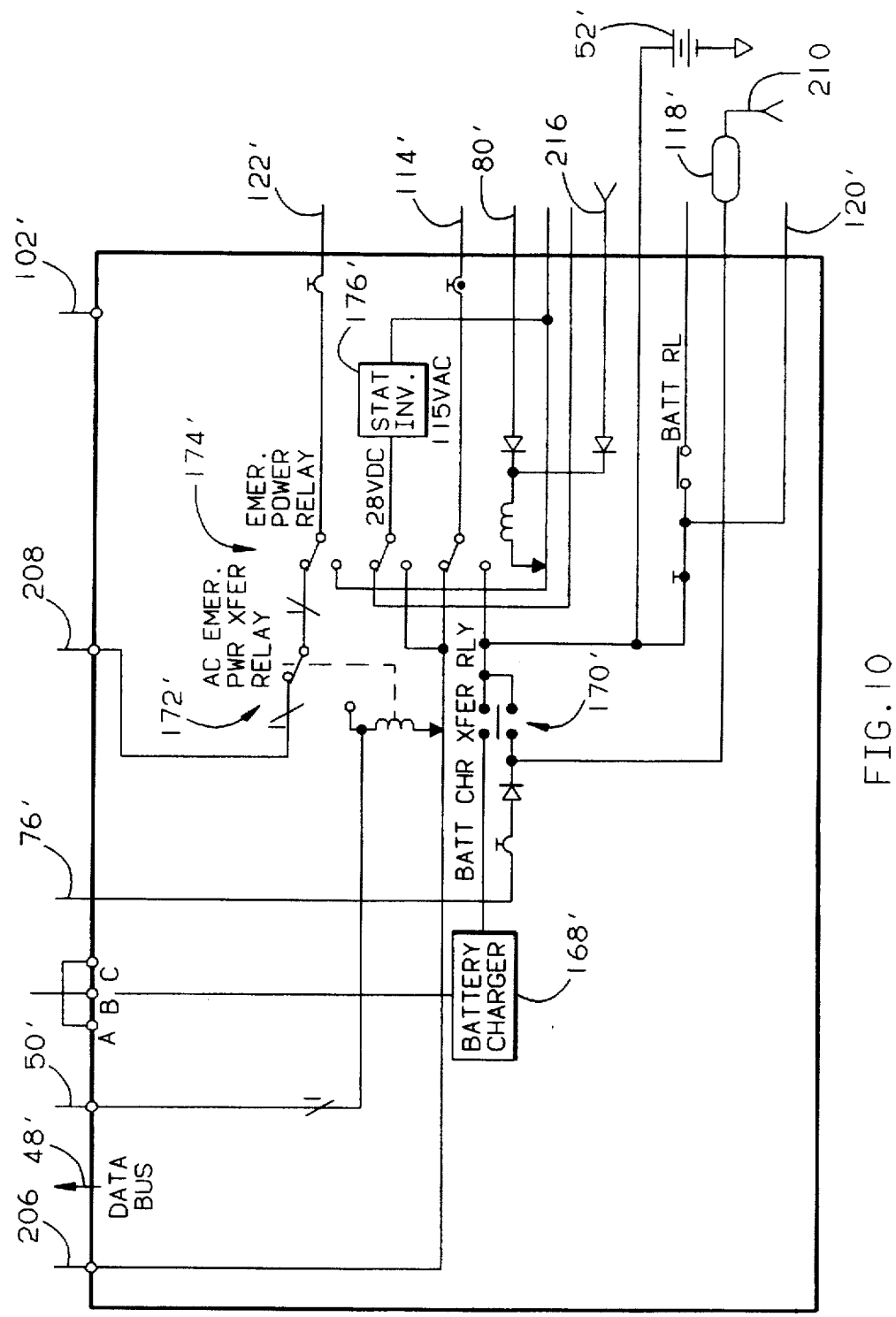
FIG. 10 is a single line block diagram illustrating a secondary power conversion and distribution unit in accordance with the embodiment of the system of the instant invention illustrated in FIG. 7.

As illustrated in FIG. 8, a dc bus tie relay 212 is included on the output line to the dc tie bus 202. This relay is controlled by the microprocessor 156'. Likewise, FIG. 9 illustrates the APCDU 58' which includes a dc bus tie relay 214 on the output line to the dc tie bus 202. The largest change in this alternate embodiment of the system of the instant invention is illustrated in FIG. 10. As may be seen from a comparison of this figure with FIG. 4, the dc cross tie function has been removed, as has the control of the external power. Additionally, one of the control lines for transfer of emergency power from the ac inputs 50' and 102' now comes from the EPCU via line 216.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electric power generation and distribution system having at least one source of ac electric power, comprising:
   a first main power conversion and distribution unit (MPCDU1) electrically coupled to the source of ac electric power for controllably supplying ac electric power to a first main distribution bus and for additionally converting the ac electric power to a second type of power, said second type of power being supplied to a first secondary distribution bus and to a converted power output; and
   a secondary power conversion and distribution unit (SPCDU) electrically coupled to said converted power output of said MPCDU1 for converting the second type of power to an emergency type of power, said emergency type of power being supplied to an emergency power bus.

2. The system of claim 1, wherein the source of ac power supplies variable frequency ac electric power, and wherein said second type of power is constant frequency ac electric power.

3. The system of claim 1, wherein the source of ac power supplies variable frequency ac electric power, and wherein said second type of power is dc electric power.

4. The system of claim 3, wherein the emergency type of power is constant frequency ac electric power.

5. The system of claim 1, wherein the source of ac power supplies constant frequency ac electric power, and wherein said second type of power is dc electric power.

6. An electric power generation and distribution system having at least one source of ac electric power, comprising:
   a first main power conversion and distribution unit (MPCDU1) electrically coupled to the source of ac electric power for controllably supplying ac electric power to a first main distribution bus and for additionally converting the ac electric power to a second type of power, said second type of power being supplied to a first secondary distribution bus and to a converted power output;
   a secondary power conversion and distribution unit (SPCDU) electrically coupled to said converted power output of said MPCDU1 for converting the second type of power to an emergency type of power, said emergency type of power being supplied to an emergency power bus; and
   wherein the source of ac power supplies constant frequency ac electric power, and wherein second type of power is dc electric power; and
   wherein said MPCDU1 senses a magnitude of said ac electric power, said MPCDU1 additionally comprising a voltage regulator responsive to said magnitude of said ac electric power, said voltage regulator controlling an excitation of the source of ac electric power to maintain said magnitude within predetermined limits.

7. The system of claim 6, wherein said MPCDU1 senses said frequency of said ac electric power, said MPCDU1 additionally comprising a frequency regulator responsive to said frequency of said ac electric power, said frequency regulator maintaining said frequency within predetermined limits.

8. The system of claim 7, wherein said MPCDU1 additionally comprises line current sensors positioned to sense the current flowing into said MPCDU1 from the source of ac electric power.

9. The system of claim 8, wherein the source of ac electric power comprises generator current sensors positioned to sense the current being supplied by the source of ac electric power, said MPCDU1 additionally comprising differential current protection circuitry coupled to said line and to said generator current sensors, said differential current protection circuitry protecting against differential current faults between said MPCDU1 and the source of ac electric power.

10. The system of claim 9, wherein said MPCDU1 additionally comprises a first main line contactor switchably coupled between the source of ac electric power and said first main distribution bus, and a first microprocessor, said first microprocessor controlling switching of said first main line contactor to controllably supply said ac electric power to said first main distribution bus.

11. An electric power generation and distribution system having at least one source of ac electric power, comprising:
   a first main power conversion and distribution unit (MPCDU1) electrically coupled to the source of ac electric power for controllably supplying ac electric power to a first main distribution bus and for additionally converting the ac electric power to a second type of power, said second type of power being supplied to a first secondary distribution bus and to a converted power output; and
   a secondary power conversion and distribution unit (SPCDU) electrically coupled to said converted power output of said MPCDU1 for converting the second type of power to an emergency type of power, said emergency type of power being supplied to an emergency power bus; and
   wherein the source of ac power supplies constant frequency ac electric power, and wherein said second type of power is dc electric power; and
   wherein the emergency type of power is constant frequency ac electric power.

12. The system of claim 11 including a battery, wherein said SPCDU further comprises an input/output coupled to the battery, said SPCDU controllably supplying dc power from the battery to a battery distribution bus.

13. The system of claim 12, wherein said MPCDU1 additionally comprises a first bus tie breaker coupled to said first main line contactor, said first bus tie breaker controllably supplying said ac electric power to a ground service bus, said bus tie breaker being controlled by said first microprocessor.

14. The system of claim 13, wherein said SPCDU additionally comprises an input coupled to said ground service bus for receiving ac electric power therefrom, and wherein said SPCDU controllably converts said ac electric power to dc to charge the battery.

15. The system of claim 13 including a second source of ac electric power, further comprising a second main power conversion and distribution unit (MPCDU2) electrically coupled to the second source of ac electric power for controllably supplying ac electric power to a second main distribution bus and for additionally converting the ac electric power to a second type of power, said second type of power being supplied to a second secondary distribution bus and to a converted power output.

16. The system of claim 15, wherein said SPCDU is electrically coupled to said converted power output of said MPCDU2, said SPCDU converting the second type of power to an emergency type of power, said emergency type of power being supplied to an emergency power bus.

17. The system of claim 16, wherein said MPCDU2 comprises a second main line contactor switchably coupled between the source of ac electric power and said second main distribution bus, and a microprocessor, said microprocessor controlling switching of said second main line contactor to controllably supply said ac electric power to said second main distribution bus.

18. The system of claim 17, wherein said MPCDU2 additionally comprises a second bus tie breaker coupled to said second main line contactor, said second bus tie breaker controllably supplying said ac electric power to said ground service bus, said second bus tie breaker being controlled by said microprocessor.

19. The system of claim 18, wherein said first bus tie breaker is additionally electrically coupled to said second bus tie breaker through an external tie bus, said external tie bus enabling supply of ac electric power from said MPCDU1 to said MPCDU2, and from said MPCDU2 to said MPCDU1.

20. The system of claim 19, wherein said MPCDU1, said MPCDU2, and said SPCDU communicate operating parameters via a communications bus to enable coordinated operation and control of the system.

21. The system of claim 16, wherein said SPCDU controllably couples said converted power output of said MPCDU1 to said converted power output of said MPCDU2 through an internal converted power tie bus.

22. The system of claim 16, wherein said MPCDU1 further comprises a first converted power relay switchably coupled to said converted power output of said MPCDU1, wherein said MPCDU2 further comprises a second converted power relay switchably coupled to said converted power output of said MPCDU2, and wherein said first converted power relay and said second converted power relay are electrically coupled together through an external converted power tie bus.

23. The system of claim 16 including a source of auxiliary ac electric power, further comprising an auxiliary power conversion and distribution unit (APCDU) electrically coupled to the auxiliary source of ac electric power for controllably supplying ac electric power to said ground service distribution bus and said external ac tie bus, and for additionally converting the ac electric power to a second type of power, said second type of power being supplied to a third secondary distribution bus and to a converted power output.

24. The system of claim 23, wherein said SPCDU is electrically coupled to said converted power output of said APCDU, said SPCDU converting the second type of power to an emergency type of power, said emergency type of power being controllably supplied to said emergency power bus.

25. The system of claim 24, wherein said APCDU comprises an auxiliary line contactor switchably coupled between the auxiliary source of ac electric power and said ground service distribution bus, and a microprocessor, said microprocessor controlling switching of said auxiliary line contactor to controllably supply said ac electric power to said ground service distribution bus.

26. The system of claim 25 including a source of external ac electric power, wherein said APCDU is electrically coupled to the source of external ac electric power for controllably supplying external ac electric power to said ground service distribution bus and said external ac tie bus, and for additionally converting the external ac electric power to a second type of power, said second type of power being supplied to said third secondary distribution bus and to said converted power output.

27. The system of claim 26, wherein said APCDU further comprises an external power relay switchably coupled between the source of external ac electric power and said ground service bus, and wherein said microprocessor controls switching of said external power relay to controllably supply said external ac electric power to said ground service distribution bus.

28. The system of claim 27, wherein said APCDU communicates operating parameters via a communications bus with said MPCDU1, said MPCDU2, and said SPCDU to enable coordinated operation and control of the system.

29. The system of claim 28, further comprising a source of uninterruptable electric power electrically coupled to said MPCDU1, said MPCDU2, said APCDU, and said SPCDU.

30. The system of claim 29, wherein said source of uninterruptable electric power comprises the battery.

31. The system of claim 29 wherein said sources of ac electric power and the source of auxiliary electric power each include a permanent magnet generator, wherein said source of uninterruptable electric power comprises means for coupling the permanent magnet generator from each source of ac electric power and the permanent magnet generator from the source of auxiliary electric power to said MPCDU1, said MPCDU2, said APCDU, and said SPCDU.

32. An electric power generation system, comprising:

a first source of ac power;

a first main power conversion and distribution unit (MPCDU1) electrically coupled to said first source of ac power, said MPCDU1 controllably supplying ac electric power to a first main distribution bus and additionally converting said ac electric power to a second type of power, said second type of power being supplied to a first secondary distribution bus and to a converted power output;

a second source of ac power;

a second main power conversion and distribution unit (MPCDU2) electrically coupled to said second source of ac power, said MPCDU2 controllably supplying ac electric power to a second main distribution bus and additionally converting said ac electric power to a second type of power, said second type of power being supplied to a second secondary distribution bus and to a converted power output;

an auxiliary source of ac power;

an auxiliary power conversion and distribution unit (APCDU) electrically coupled to said auxiliary source of ac power, said APCDU controllably supplying ac electric power to a ground service distribution bus and additionally converting said ac electric power to a second type of power, said second type of power being supplied to a third secondary distribution bus and to a converted power output;

an ac tie bus; and wherein said MPCDU1, said MPCDU2, and said APCDU each controllably supply ac electric power to said ac tie bus and controllably demand ac electric power from said ac tie bus.

33. The system of claim 32, additionally comprising a central power conversion and distribution unit (CPCDU) electrically coupled to said converted power output of said MPCDU1, to said converted power output of said MPCDU2, and to said converted power output of said APCDU, said CPCDU selectively converting said second type of power from said MPCDU1, said MPCDU2, and said APCDU to an emergency type of power, said CPCDU further controllably supplying said emergency type of power to an emergency distribution bus.

34. The system of claim 32, further comprising:
a converted power tie bus; and
wherein said MPCDU1 further comprises a first converted power relay switchably coupling said converted output of said MPCDU1 to said converted power tie bus; and
wherein said MPCDU2 further comprises a second converted power relay switchably coupling said converted output of said MPCDU2 to said converted power tie bus; and
wherein said APCDU further comprises a third converted power relay switchably coupling said converted output of said APCDU to said converted power tie bus.

35. The system of claim 32, further comprising:
a receptacle electrically coupled to said APCDU for receiving a source of external electrical power; and
wherein said APCDU switchably couples the source of external electrical power to said ac tie bus.

36. The system of claim 33, further comprising an electrical power control unit (EPCU) in communication with said MPCDU1, said MPCDU2, said APCDU, and said CPCDU, said EPCU being responsive to system operating parameters and external user input to selectively coordinate operation of the system.

37. The system of claim 33, further comprising a battery supplying dc electrical power to said CPCDU, said CPCDU selectively converting said dc electrical power to an emergency type of power for controllably supplying to said emergency distribution bus.

38. The system of claim 37, wherein said CPCDU further comprises battery charging circuitry electrically coupled to said ground service distribution bus, said battery charging circuitry controllably charging said battery.

39. In an electric power generation system having at least two main sources of ac electric power, an auxiliary source of ac electric power, an external source of ac electric power, and a battery, a power conversion and distribution unit for controlling distribution of ac electric power and for converting the ac electric power to dc electric power for controlled distribution thereof, the power conversion and distribution unit comprising:

a housing;

a first set of electrical connectors penetrating said housing for receiving ac electrical power from a source of ac electric power;

a second set of electrical connectors penetrating said housing for delivering ac electrical power to utilization equipment;

a third set of electrical connectors penetrating said housing for delivering dc electrical power to utilization equipment;

a main line contactor removably mounted on said housing;

internal bus work electrically coupling said first and said second sets of electrical connectors to said main line contactor;

power conversion circuitry mounted within said housing and electrically coupled to said internal bus work, said power conversion circuitry converting the ac electric power to dc electric power, said dc electric power being electrically coupled to said third set of electrical connectors;

control circuitry mounted within said housing and in sensory communication with parameters of said ac and said dc electric power, said control circuitry providing voltage and frequency control for its associated source of ac electric power, said control circuitry further controlling said main line contactor in response to said parameters of said ac electric power and external user input, said control circuitry further communicating sensed system operating parameters with an external data bus.

40. The unit of claim 39, further comprising:
a fourth set of electrical connectors penetrating said housing for delivering ac electrical power to an external tie bus;
a bus tie contactor removably mounted on said housing and in electrical contact with said internal bus work and said fourth set of electrical connectors.

* * * * *